United States Patent [19]

Horigome

[11] 4,103,311
[45] Jul. 25, 1978

[54] METHOD AND APPARATUS FOR ADJUSTING THE VIEW FINDER OF A SINGLE-LENS REFLEX CAMERA

[75] Inventor: Hirofumi Horigome, Kawasaki, Japan

[73] Assignee: Ricoh Co., Ltd., Tokyo, Japan

[21] Appl. No.: 792,970

[22] Filed: May 2, 1977

[30] Foreign Application Priority Data

May 10, 1976 [JP] Japan ................................ 51-52185

[51] Int. Cl.² .............................................. G03B 19/12
[52] U.S. Cl. ..................................................... 354/152
[58] Field of Search ................................ 354/150–155

[56] References Cited

U.S. PATENT DOCUMENTS

3,668,993  6/1972  Kurie ..................................... 354/155

FOREIGN PATENT DOCUMENTS

955,694    7/1949  France ................................... 354/152
1,252,523  10/1967  Fed. Rep. of Germany ....... 354/152

Primary Examiner—Donald A. Griffin
Attorney, Agent, or Firm—Frank J. Jordan

[57] ABSTRACT

A method and apparatus for adjusting the view finder of a single-lens reflex camera in which method and apparatus the adjustment of the angle of the swingable mirror and the adjustment of the optical distance from the taking lens to the focusing screen via the swingable mirror are both performed in respect of the swingable mirror after the focusing screen has been set in place in the camera, thus obviating the need for a variety of shims that would otherwise be necessary in positioning the focusing screen at precisely the proper position from the swingable mirror.

5 Claims, 4 Drawing Figures

METHOD AND APPARATUS FOR ADJUSTING THE VIEW FINDER OF A SINGLE-LENS REFLEX CAMERA

BACKGROUND OF THE INVENTION

1. Field of the Invention

This invention relates to a method and apparatus for adjusting certain physical dimensions of the view finding system of a single-lens reflex camera to permit a clear and sharp image to appear on the focusing screen of the camera.

More specifically, this invention relates to such an adjusting method and apparatus in which the focusing adjustment of the view finder system is carried out by reducing the deviation from a slant angle of 45° of the swingable mirror and by translating the swingable mirror toward or away from the focusing screen to thereby properly adjust the view finder system without need of adjusting the focusing screen.

2. Description of the Prior Art

As shown in FIG. 1, a single-lens reflex camera has a mirror box 2 in a camera body 1. A swingable mirror 4 is fitted in a mirror frame 3. The mirror frame is rotatably fixed to the mirror box 2 in such a way that the swingable mirror 4 is capable of swinging upward about a shaft 5. An actuating mechanism (not shown) for swinging up the mirror 4 when the shutter button is depressed is provided on one side of the mirror box 2. A focusing screen 6 and an associated condenser lens 7 are fixed in place on a shelf 2a at the top of the mirror box 2. Other important parts of the single-lens reflex camera are a taking lens 8 fixed to rest flush on an annular plane 1a of the camera body 1, a photosensitive film 9, a penta prism 10 and an exposure meter 11 having a pointer 11a.

With this arrangement, a high degree of dimensional precision is required in several respects. First it is essential that the plane 1a on which the taking lens is supported should lie exactly parallel to the plane 1b on which the photosensitive film is supported. Again the shelf 2a on which the focusing screen 6 rests must be precisely parallel to the optical axis "OL" of the taking lens. Furthermore, the point "P" at which the beam of light traveling along the optical axis "OL" falls on and reflects from the swingable mirror 4 must be exactly the same distance from both the plane 1b and the plane 1c. (That is to say the optical distance between plane 1a and the focal plane 6a of the focusing screen 6 via the point "P" must be equal to the optical distance between the plane 1a and the plane 1b via the point "P" or, in other words, the relationship $a + b = a + c$ must be satisfied where "a" stands for the distance from the reflecting point "P" to the plane 1a; "b" stands for the distance from "P" to the plane 1b; and "c" stands for the distance from "P" to the focal plane 6a of the focusing screen.)

Ordinarily, an attempt is made to attain a satisfactory degree of precision in these respects by a method that will now be described with respect to FIG. 1. First, one or the other of the planes 1a and 1b is machined and is then used as the standard for trimming the other plane. This is a fairly simple process by which a high and quite satisfactory degree of parallelism can be attained between the two planes without much difficulty. Next the flat surface (1c in FIG. 1) of the bracket on which the mirror box is fixed within the camera body is trimmed with reference to the planes 1a and 1b already machined. That is to say, the bracket surface 1c must be trimmed so as to be exactly perpendicular to the planes 1a and 1b and, furthermore, so as to be a precise distance "d" (determined by the thickness of the mirror box 2 and other factors) from the optical axis "OL". In this process, it is very difficult to attain a satisfactory degree of precision even with the most expensive equipment and skilled workmanship. Where there is a restriction on the production cost of the camera, the degree of precision actually attained is invariably less than what is required. Setting of the swingable mirror at an angle of precisely 45° presents another virtually insurmountable problem since this adjustment entails making compensation for various unknown factors such as the trueness of the mirror frame 3 and the shaft 5.

For practical purposes then, it is impossible to set the focusing screen with its focal plane exactly parallel to the optical axis and separated therefrom by precisely the distance "c" as defined earlier. In view of this impossibility, it is the ordinary practice to first set the swingable mirror to as close to 45° as is possible and then to carry out the focusing adjustment by adjusting the focusing screen to reduce the overall error in the focusing system of the view finder. More specifically, this adjustment of the focusing screen is carried out by inserting an adjusting shim or shims in the space between the focusing screen 6 and the shelf 2a. In general, the maladjustment of the focusing screen 6 is not only one of improper distance from the optical axis "OL" but a combination of improper distance and non-parallelism resulting from the accumulated affect of errors appearing at different parts of the structure. Therefore, flat shims are useless and a variety of adjusting shims are required. Selection of a proper shim from among numerous shims prepared in advance is tedious and time-consuming work and is the cause for increased cost. In an attempt to obviate the need for using non-flat adjusting shims there has been proposed a structure as shown in FIG. 2 and described in Japanese utility model publication No. 8465/1957 which permits a final adjustment of the swingable mirror after the height of the focusing screen has been adjusted by the use of flat shims. As seen in FIG. 2, the proposed structure is provided with an elbow lever 51 rotatably fixed to one side or the other of the mirror box. The vertical extension of the elbow 51 has an arcuate slot 54 which extends along an arc of a circle having a pin 53 as its center. The swingable mirror 55 is pivotally connected via a pin 52 to the free end of the horizontal extension of the elbow. A crosswise deviation of the mirror 55 from the proper position can be reduced by rotating the elbow 51 about the pin 53 by an appropriate amount. Thanks to this adjustable structure, the shims pushed under the combined condenser lens and focusing screen 56 can all be made flat and, although they must be prepared in different thicknesses, there is no need for preparing non-flat shims of various shapes.

Another adjusting technique is disclosed in Japanese utility model publication No. 35319/1974 which relates to an improvement in the method of adjusting the swingable mirror to a slant of 45°. Whereas this adjustment of the angle between the swingable mirror and the optical axis of the taking lens was previously performed at two selective points of the mirror catching-and releasing part so that the total adjustment would put the swingable mirror in the proper position, this utility model publication proposes a technique for reducing the number of adjustment points to only one, thereby reducing the difficulty encountered in setting the swingable mirror at 45°.

The two adjusting techniques mentioned above have one thing in common. Namely, in each the overall adjustment of the view finder system of the single-lens reflex camera is accomplished by separately adjusting two different elements of the system. That is, one part of the adjustment relates to the swingable mirror and is aimed at properly setting its angle with respect to the optical axis of the taking lens and the other part of the adjustment relates to the focusing screen and is directed to adjusting the distance between said screen and the optical axis. In this sense, these techniques are well-founded and useful. In analyzing the methods they employ, it might be said that in each case a certain part of the adjustment is shifted from the focusing screen to the swingable mirror and that, as a consequence, only flat shims are required thus obviating the necessity for first preparing and then carefully selecting and using shims of different shapes which would otherwise be indispensable in making the adjustment.

However, it is apparent that it would be still more advantageous to be able to perform the whole adjustment only by adjusting the swingable mirror. That is to say it would be most convenient to have a method and apparatus whereby what has heretofore been accomplished by separately adjusting the focusing screen and the swingable mirror could be attained solely by adjusting the swingable mirror thus obviating the need to adjust the focusing screen altogether.

SUMMARY OF THE INVENTION

In the light of the foregoing observations and description of methods and apparatuses for adjusting the view finder system of single-lens reflex camera, the principal object of this invention is to provide a method and apparatus for adjusting the view finder system of a single-lens reflex camera in which method and apparatus the whole adjustment as required is carried out on the swingable mirror to reduce the total error accumulated in the course of assembling the single-lens reflex camera.

To attain this object, the method according to this invention comprises: providing a mirror frame having upper and lower arms jointed together, said lower arm supporting the swingable mirror, and the free end of said upper arm being rotatably fixed to the mirror box; raising or lowering the free end of said lower arm so as to adjust the slant angle of the swingable mirror; and raising or lowering the joint between said upper and lower arms of said mirror frame and at the same time raising or lowering the free end of said lower arm so as to translate the swingable mirror with respect to the focusing screen in such a way that the adjustment of the optical distance from the taking lens to the focusing screen is performed.

An adjusting structure according to this invention comprises a mirror frame having upper and lower arms jointed together, the free end of said upper arm being pivotably fixed to the mirror box and said lower arm bearing the swingable mirror; a translation control arm one end of which has a cam surface in slidable contact with the joint between said upper and lower arms of said mirror frame; a slant angle control member for setting the swingable mirror at 45°, said slant angle control member being capable of moving along with said control arm; and means for driving the joint of said control arm and said slant angle control member so as to translate said mirror frame, thus performing the adjustment of the optical distance from the taking lens to the focusing screen and the adjustment of the slant angle of the swingable mirror.

Various other objects, features and advantages of this invention will become more apparent by reference to the following detailed description of preferred embodiments thereof taken in conjunction with the accompanying drawings as follows.

PREFERRED EMBODIMENTS OF THE INVENTION

Figure 1:
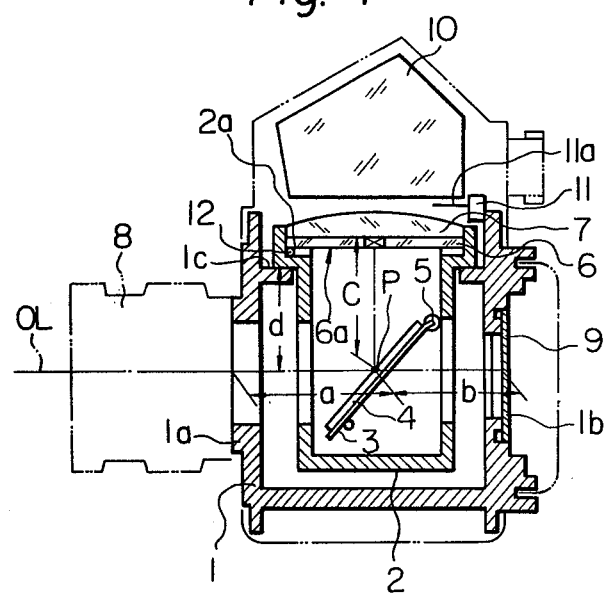
FIG. 1 is a sectional view of a single-lens reflex camera showing those elements particularly important to the view finder system.
Figure 2:
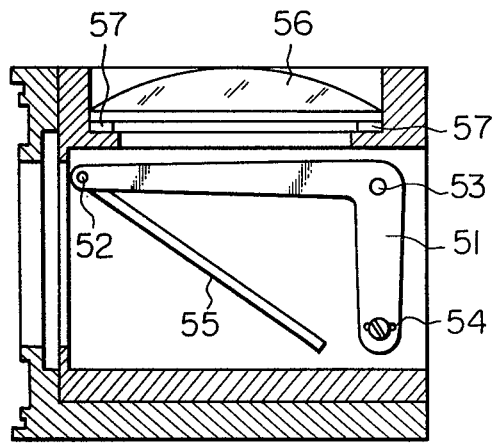
FIG. 2 is a simplified sectional view of a conventional structure for adjusting the position of the swingable mirror in a single-lens reflex camera.
Figure 3:
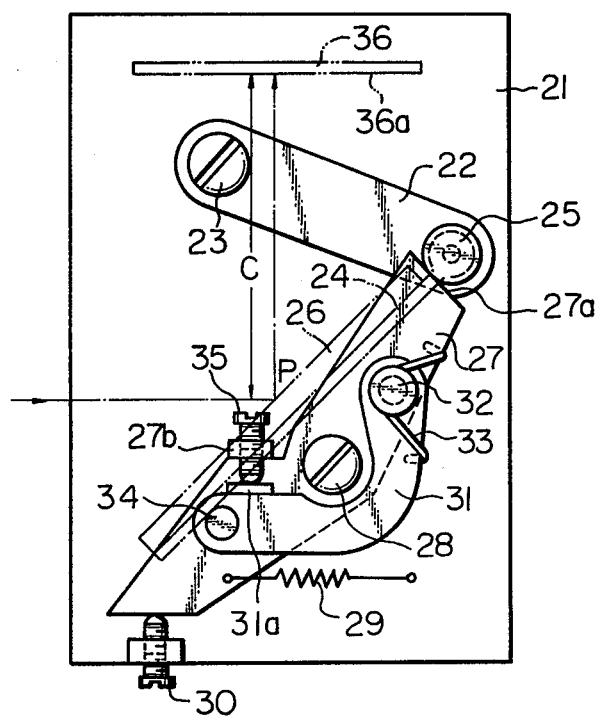
FIG. 3 is a schematic side view of one embodiment of the present invention.

Referring to FIG. 3, there is shown a first embodiment according to this invention. In the drawing, 21 is a mirror box. A pair of upper mirror supporting arms 22 are pivotably fixed one on the right inside wall and the other on the left inside wall of the mirror box 21. The upper supporting arm 22 shown in FIG. 3 is the one which is pivoted on the left inside wall as viewed from the taking lens. These upper supporting arms 22 are spring-biased so that they are urged to rotate clockwise about their respective pins 23. The free ends of the upper supporting arms are connected to each other by a cross bar 25. A mirror frame 24 is rotatably fixed to the cross bar 25 and is spring-biased so as to rotate counterclockwise about the cross bar 25. A swingable mirror 26 is fitted in the mirror frame 24. A focus adjusting arm 27 has a cam surface 27a at the upper end and a bent bracket 27b at the middle thereof. The cam surface 27a is in slidable contact with the cross bar 25 or with some other member (not shown) integrally connected to the free ends of the upper arms 22. The focus adjusting arm 27 is pivotably fixed to the mirror box 21 and is rotatable about the pin 28. Also, the focus adjusting arm 27 is spring-biased by a tension spring 29 so as to rotate counterclockwise about the pin 28. A focus adjusting screw 30 is fixed to the bottom of the mirror box and the adjusting screw is in contact with the bottom end of the focus adjusting arm 27. Rotation of the adjusting screw 30 causes the focus adjusting arm 27 to rotate clockwise or counterclockwise about the pin 28. A 45° slant position adjusting elbow 31 is pivotably fixed to the focus adjusting arm 27 and is spring-biased by a spring 33 so as to rotate clockwise about the pin 32. A cross pin 34 is connected to the free end of the elbow 31 and the mirror frame 24 is brought into abutment with the pin 34 so that the mirror frame is set at 45°. A bent bracket 31a is provided in the vicinity of the free end of the elbow 31. A 45° slant position adjusting screw 35 is threadedly inserted in the hole of the bent bracket 27b until the tip of the screw has reached the bent bracket 31a of the elbow 31. A focusing screen 36 is fixed to the mirror box 21. The mechanism for operating the swingable mirror is well known and, therefore, it is neither described herein nor shown in the drawings.

With the arrangement as described above, the focus adjusting elbow 31 is swung clockwise or counterclockwise by rotating the adjusting screw 35 in one direction or the other until the swingable mirror 26 has been set at 45°. In this way the swingable mirror 26 can be set exactly at 45° quickly and with ease.

In setting the swingable mirror at the distance "c" from the focal plane 36a, if the adjusting screw 30 is rotated in one direction or the other, the focus adjusting arm 27 is swung clockwise or counterclockwise about the pin 28 and, accordingly, the mirror supporting arms 22 are swung clockwise or counterclockwise about the pins 23 and, at the same time, the cross pin 34 is raised or lowered, thus setting the swingable mirror 26 at the proper distance "c" from the focal plane 36a. This positioning can be performed after the focusing screen 36 has been completely fixed to the mirror box, thus obviating the necessity of selecting and using a shim to find the proper position of the focusing screen with respect to the swingable mirror.

Figure 4:
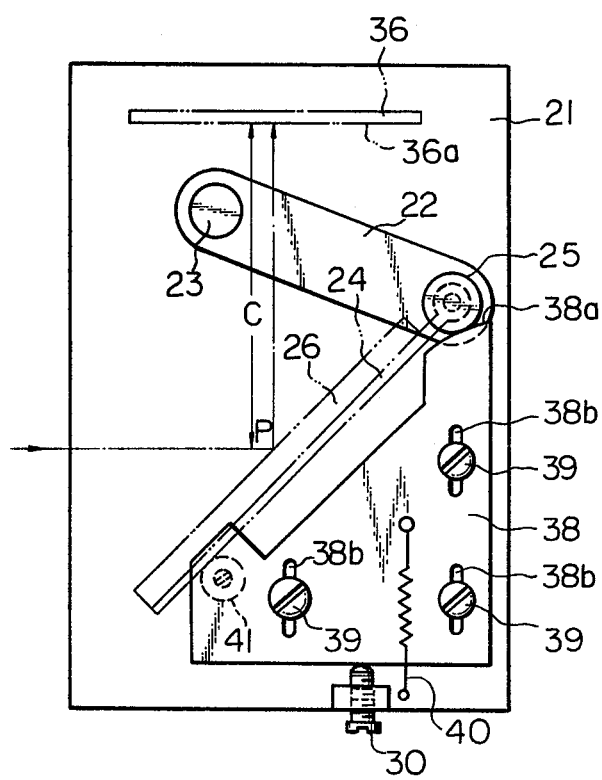
FIG. 4 shows a schematic side view of another embodiment according to the present invention.

Referring to FIG. 4, there is shown a second embodiment according to this invention. In the drawing, the same parts as those of the first embodiment are indicated by the same reference numerals as used in FIG. 3. In FIG. 4, a focus adjusting plate 38 has a cam surface 38a slidably in contact with the free end of the mirror supporting arm 22, the pin 25 of the free end of the arm 22 or some other member (not shown) fixed to the free end of the arm 22. The focus adjusting plate 38 has three longitudinal slots 38b and three guide pins 39 associated therewith. The plate 38 is spring-biased downward by a tension spring 40 which is fixed to the mirror box 21. An eccentric pin 41 is rotatably fixed to the focus adjusting plate 38 and is in contact with the mirror frame which slants at approximately 45°.

With this arrangement the swingable mirror can be easily set at precisely 45° simply by rotating and setting the eccentric pin 41. Also, by rotating the adjusting screw 30 in one direction or the other, the focus adjusting plate 38 is raised or lowered and accordingly the eccentric pin 41 and the elbow jointing the mirror frame 24 and the mirror supporting arm 22 are raised or lowered so that the swingable mirror 26 is set at the proper distance "c" from the focusing screen 36. As seen from the above, the second embodiment also permits the whole adjustment to be performed without moving the focusing screen 36, thus obviating the necessity of using adjusting shims. The focus adjusting plate is described and shown as rising and descending in the vertical direction but this plate may be designed to move in an oblique direction, when occasion demands.

As is apparent from the above, no adjustment of the focusing screen is required and, instead, the whole adjustment as required is performed by inclination and translation of the swingable mirror, thus facilitating the adjustment of the finder system of a single-lens reflex camera, and hence reducing the cost involved in assembling the single-lens reflex camera.

What is claimed is:

1. Method for adjusting the view finder system of a single-lens reflex camera characterized in that it comprises:
   providing a mirror frame having upper and lower arms jointed together, the free end of said upper arm being rotatably fixed to the mirror box, said lower arm bearing the swingable mirror;
   adjusting the position of said lower arm so as to set the swingable mirror at an angle of 45° with respect to the optical axis of the taking lens; and
   raising or lowering the joint between said upper and lower arms of said mirror frame and at the same time raising or lowering the free end of said lower arm so as to translate the swingable mirror with respect to the focusing screen, whereby the optical distance from the taking lens to the focusing screen via the swingable mirror is adjusted.

2. An apparatus for adjusting the view finder system of a single lens reflex camera characterized in that it comprises:
   a mirror frame having upper and lower arms jointed together, the free end of said upper arm being rotatably fixed to the mirror box, said lower arm bearing the swingable mirror;
   a translation control arm whose one end has a cam surface in contact with the joint between the upper and lower arms of said mirror frame;
   a slant angle control member for setting the swingable mirror at 45° with respect to the optical axis of the taking lens, said member being capable of moving along with said translation control arm; and
   means for driving said translation control arm to move the joint of said mirror frame and said slant angle control member,
   whereby said swingable mirror set at 45° with respect to the optical axis of the taking lens is translated with respect to the focusing screen.

3. An apparatus according to claim 2, wherein said slant angle control member comprises:
   an elbow pivoted to said translation control arm at one end and provided with a cross pin at the other end, said cross pin holding said mirror frame; and
   means for displacing said elbow to change the relative position of said elbow with respect to said translation control arm.

4. An apparatus according to claim 3, wherein said cross pin is eccentric.

5. An apparatus according to claim 2, wherein said translation control arm comprises a swinging lever pivoted to a stationary part of the camera.

* * * * *